United States Patent [19]
Lacroix

[11] 3,915,023
[45] Oct. 28, 1975

[54] SPEED SELECTOR CONTROL FOR TORQUE-CONVERTER SYSTEMS

[76] Inventor: Jean Paul Lacroix, 12064 Taylor Blvd., Montreal, Quebec, Canada, H3M 2J8

[22] Filed: Mar. 11, 1974

[21] Appl. No.: 450,155

[52] U.S. Cl............... 74/230.17 B; 74/474; 74/481; 74/501 R
[51] Int. Cl.².......................................... F16H 55/56
[58] Field of Search ............ 74/230.17 A, 230.17 B, 74/473 R, 474, 479, 480 R, 481, 482, 501 R, 502

[56] References Cited
UNITED STATES PATENTS

| | | | |
|---|---|---|---|
| 795,386 | 7/1905 | Cutter | 74/230.17 A |
| 2,072,285 | 3/1937 | Walker | 74/482 |
| 2,188,253 | 1/1940 | Reeves | 74/230.17 A |
| 2,491,248 | 12/1949 | Carroll | 74/230.17 A |
| 2,636,396 | 4/1953 | Reeves | 74/230.17 A |
| 2,797,590 | 7/1957 | Reeves | 74/230.17 A X |
| 3,537,328 | 11/1970 | Allen | 74/481 |

*Primary Examiner*—Allan D. Herrmann

[57] ABSTRACT

A clutch driver pulley (of a V belt type of automatic torque-converter) has the outboard (sliding) part connected by screws or bolts to a cupped side cover which is sandwiched by a set of inner and outer thrust bearings (located on centerline) and connected, through a metal cable, to a sport console type of shift arm or control. The positioning (and locking) of the shift arm for the selected speed ratio, restricts (through tension on the cable) the automatic inboard movement of the outboard sliding part of the driver pulley, and limits the automatic movement (in closing only) of the driver pulley to the maximum speed selected while still permitting automatic movement (under variable speeds and/or torques) from maximum selected speed ratio down to neutral, or back to the maximum speed ratio selected. This selection through the shift arm would permit any selections like neutral, first, second, third, or fourth, etc.; the selection being made through the pull exerted (on the inner thrust bearing) by the metal cable, while still permitting automatic movement between neutral and the maximum speed ratio selected. A finger, at the driver's end of the cable, prevents it from twisting. The outer thrust bearing would serve only for a temporary restricted push inwards (through a mechanical mean like pivoting arm) to force the driver pulley to close enough for engaging to first speed (from neutral) when the motor is idling, and when compression is required, like when going downhill.

6 Claims, 5 Drawing Figures

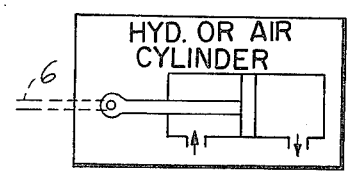
FIG. 1a
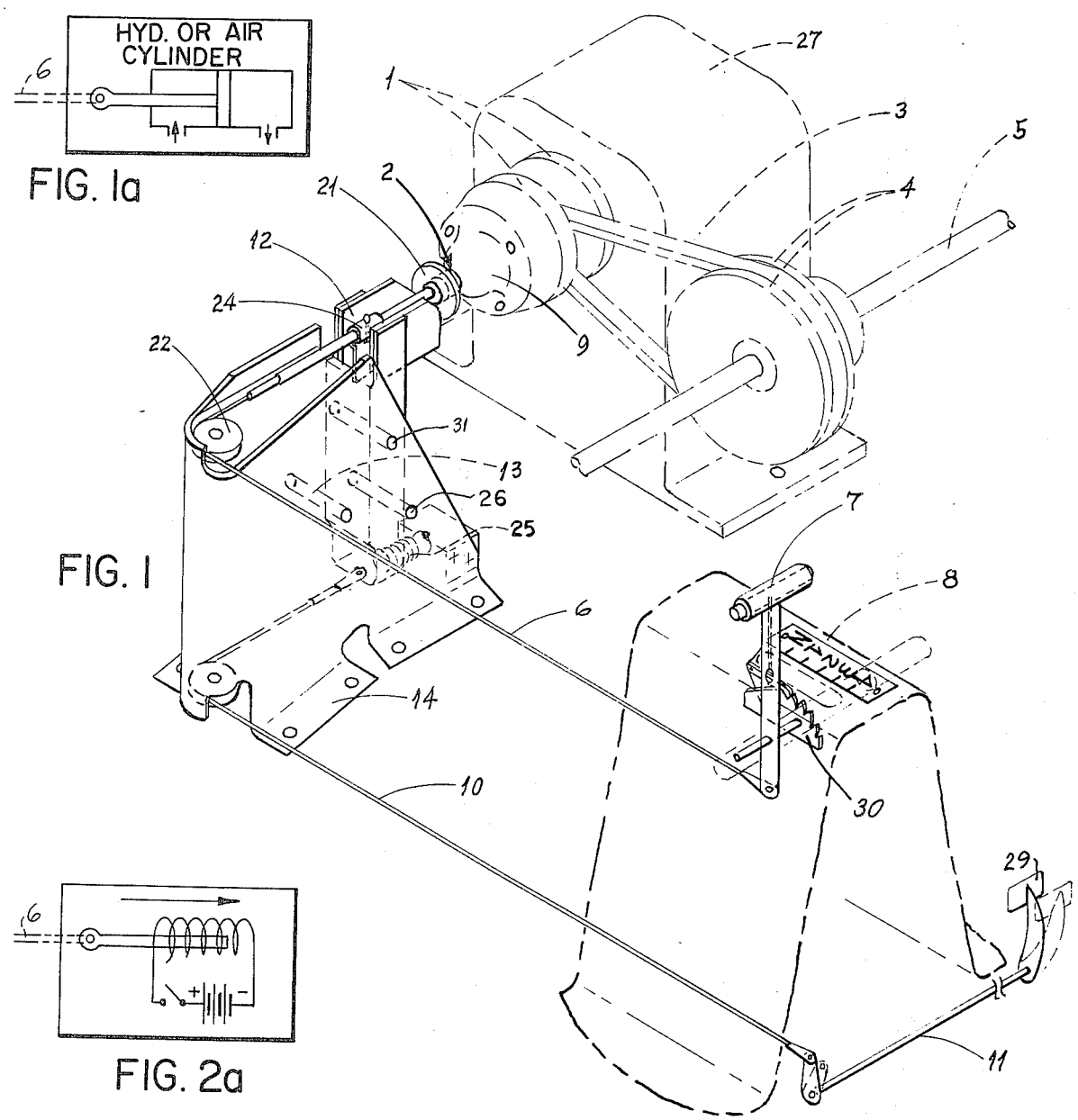
FIG. 1
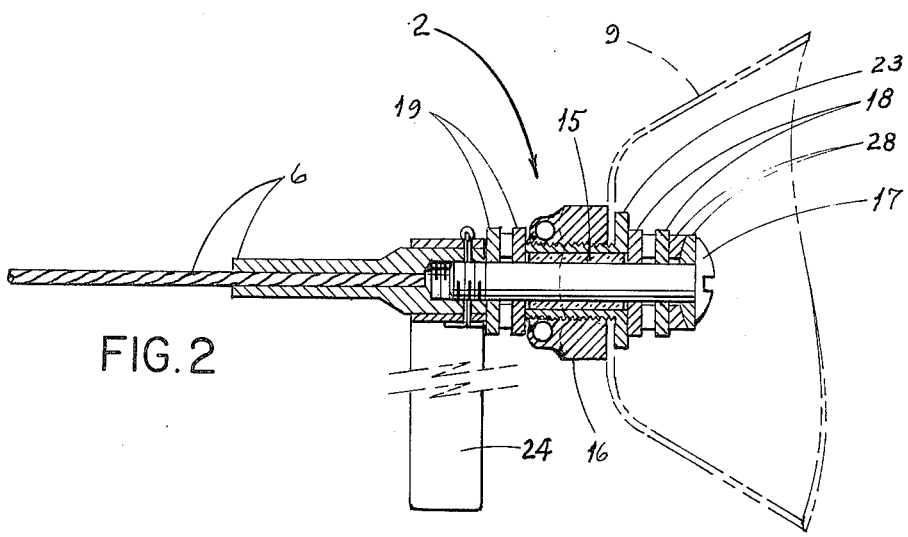
FIG. 2a
FIG. 2

SPEED SELECTOR CONTROL FOR TORQUE-CONVERTER SYSTEMS

The invention relates to a transmission system applied to any type of self-propelled vehicles, the propelling means of which is using a V belt type of automatic torque-converter, with variable clutch driver and driven pulleys and a driven variable pulley.

More particularly, the invention relates to a cable arrangement which permits, through the control media of one cable, to restrict the closing of the clutch driver pulley to any one of the pre-selected speed ratios anywhere from neutral to full forward speed, or in between and this, without impairing in any way with the normal automatic characteristics inherent to such torque-converter, being still free to operate from neutral to the pre-selected speed ratio and/or back to neutral. A second cable, by pulling on a pivoting arm, exerts pressure inwards on the clutch driver pulley, forcing it to close of a light pre-determined amount, bringing the clutch driver pulley in an equivalent position to a first speed (from neutral), permitting to take advantage of the motor in compression. A release on the cable would bring the clutch back automatically to neutral due to the motor low R.P.M.

The invention consist of a bracket assembly and a cable arrangement comprising two cables (both working in tension); one cable connects, at one end, with one assembly of console (for thrust bearings, and at the other end with a "Select Shift" type of arrangement on sport type console (for selection of speed ratios or neutral); which "Select Shift" could be made principally of a selector T arm (or equivalent), locking on with a ratchet type of arrangement, or could also have other means of control like with the aid of either an air or hydraulic cylinder, or even with electrical means; the other cable, at one end, connects with a pivoting arm kept in a non-operative position by a tension spring, while at the other end connecting through the cable, with a pivoting arm for foot operation, or other leverage type of control.

A cluth driver pulley (of a V belt type of automatic torque-converter) has the outboard (sliding) part connected by screws or bolts to a cupped side cover which is sandwiched by a set of inner and outer thrust bearings (located on centerline) and connected, through a metal cable, to a sport console type of shift arm or control. The positioning (and locking) of the shift arm for the selected speed ratio, restricts (through tension on the cable) the inboard movement of the outboard sliding part of the driver pulley, and limits the automatic movement (in closing only) of the driver pulley to the maximum speed selected, while still permitting automatic movement (under variable speeds and/or torques) from maximum selected speed ratio down to neutral, or back to the maximum speed ratio selected. This selection through the shift arm would permit any selections like neutral, first, second, third, etc.; the selection being made through the pull exerted (on the inner thrust bearing) by the metal cable, while still permitting automatic movement between neutral and the maximum speed ratio selected. The outer thrust bearing would serve only for a temporary restricted push inwards (through a mechanical mean like pivoting arm) to force the driver pulley to close enough for engaging to first speed (from neutral) when the motor is idling, and when compression is required, like when going downhill.

One object of the present invention is the provision of a driving system of automatic transmission characteristics which, through its extreme simplification, minimizes both the weight and the cost of the vehicles so equiped.

Another object of the invention is the provision of an automatic transmission with selector shifting characteristics which, through the simplicity of its design, not only make field repair possible and easy but would also permit the automatic features inherent to the V belt type of automatic torque-converter to keep on working normally in case of breakage or malfunctioning of the "Speed Selector Control."

Still another object of the invention is the provision of a driving control system which, through the simplicity of its design avoids the complexity, high fabrication cost, high repair cost of conventional gear box arrangement, or gear type of automatic transmission.

A further object of the invention is the provision of a driving control system which, while correcting for the usual lack of control of the V belt type of automatic torque-converter, still retains its full features of automatic equivalence while adding to it, features equivalent (for forward ratios, neutral, compression) to the usual gear type of automatic transmission, with its sport type console convenience and sales appeal.

The foregoing and other features and advantages will become more apparent from the following description having references to the appended drawings wherein:

FIG. 1 is a perspective view of a motor and V belt type of automatic torque-converter connected to a SPEED SELECTOR CONTROL FOR TORQUE-CONVERTER SYSTEMS, including features like four forward speed ratios and neutral on a sport console, with a ratchet arrangement for selective stops and a T like arm for shifting control. Shown also is the motor compression feature, with foot pedal control.

FIG. 1a is showing a cylinder and piston assembly which can either be of air or hydraulic operation, and which is showing different options in operating the first and second cable assemblies.

Figure 3:
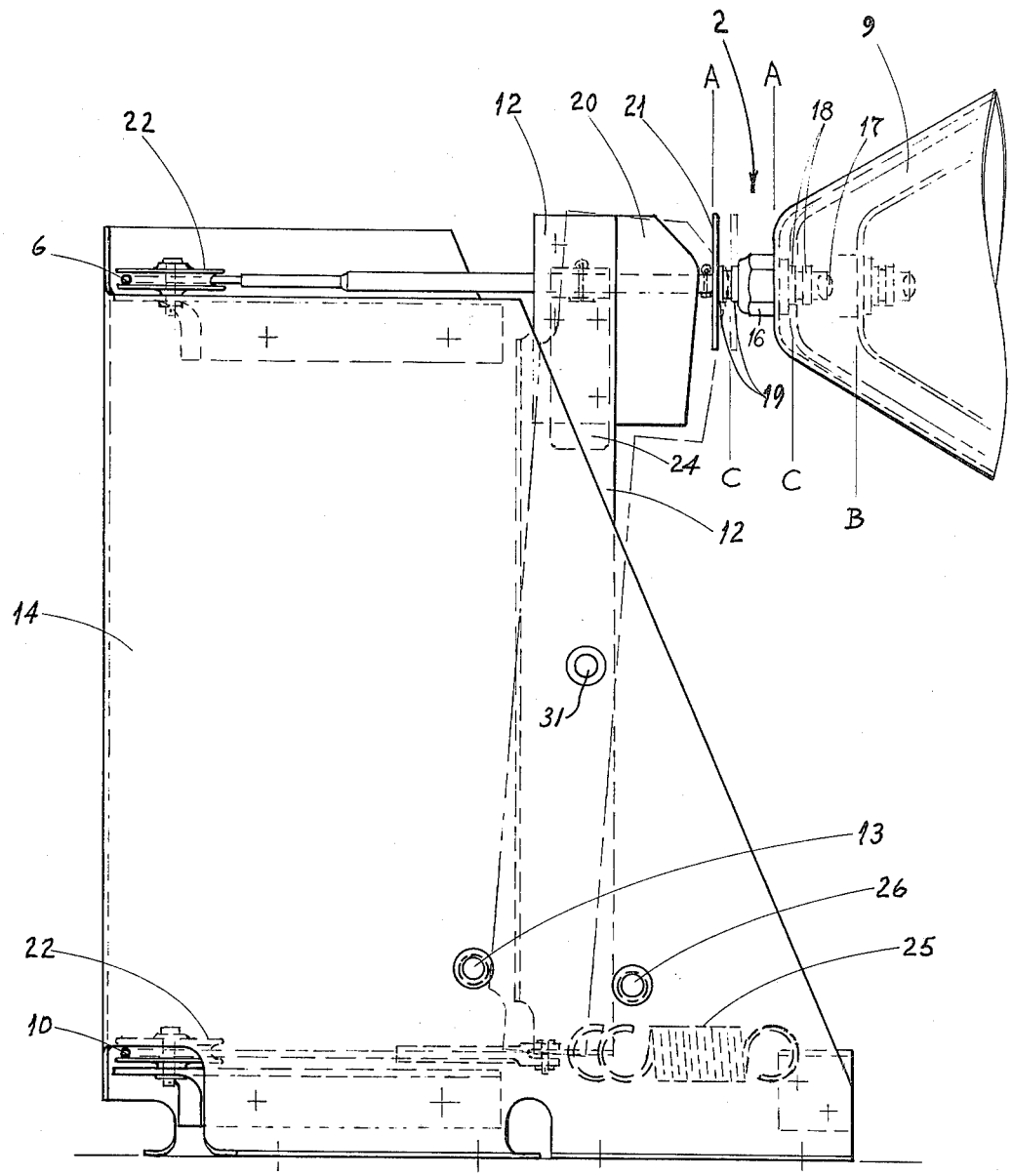

FIG. 2 is a sectional view of the thrust bearings assembly 2 (with its non-rotating shaft 17, and cable 6 end connection). This assembly, which is part of assembly on FIG. 1, is also (all by itself) a low cost alternative to FIG. 1, retaining only the sport console 8 with its selector arm 7, in which case there would be eliminated the bracket assembly 14 (with its pulleys 22, and pivoting arm assembly 12), and also assemblies of cable 10 and foot pedal 11. Such a simplified alternative, leaving only assemblies thrust bearings 2, cable 6 and selector arm 7 (on console 8), would have the same characteristics as per FIG. 1, with the exception of motor compression (on demand) from the foot pedal.

FIG. 2a is showing electical means of operation, with induction-coil and plunger assembly, where electrical impulses would instigate pulling action for the first and second cable assemblies.

FIG. 3 is a side view of the bracket assembly 14, pivoting arm assembly 12, thrust bearings assembly 2, and washer plate 21.

Refering to the drawings, FIG. 1 shows a motor 27 on which is installed the clutch driver pully 1 being part of the torque-converter system with the belt 3 and the variable driven pulley 4 transmitting a rotational torque to the driving shaft 5 connecting possibly to a forward-/reverse mechanism (not shown) and on to the driving wheels (not shown).

From selector arm 7, the cable assembly 6 goes rearward and around a metal or plastic pulley 22 and then connects on to the thrust bearings assembly 2. Pulleys may be eliminated if the motor assembly is rotated of 90° (like when connecting through a T-drive with the live shaft 5, instead of connecting directly through a belt type torque-converter). The thrust bearings assembly 2 is sandwiching over the cupped hat cover 9 held firmly on and part of clutch driver pulley 1.

The forward end of cable assembly 6 is connected on to a shifting mechanism of which the selector arm 7 is part of. This selector arm 7 pivots in five different positions being: neutral, first, second, third and fourth representing different selective forward speed ratios, but any other ratios or different arrangements may be used. A push button (on top or on the side) could actuate a ratchet device (item 30) for holding firmly to the speed ratio selected, which speed ratios are showing on the sport console 8, located normally on the right side of the driver and at arm's reach.

FIG. 1 shows the selector arm 7 locked at position "neutral," actually locking the driver pulley 1 in a condition of "neutral" (completely opened).

Any selected shift, by pulling on the cable 6, is restricting the inward movement of the outer (sliding) part of the clutch driver pulley 1, and by the same token, is preventing the clutch driver pulley 1 from closing any further but to an equivalence of speed ratio as per the one selected, while interfering in no other way whatsoever with the usual automatic movement of the torque-converter, back and forth, in between neutral and the speed selected as a maximum.

If the selector arm 7 was positioned at 4, then the looseness of the cable 6 would allow full closing of the driver pulley 1, permitting full back and forth automatic movement of the variable-speed V belt type of automatic torqueconverter. Any location, of the selector arm 7, in between position 1 and position 4 would restrict the movement of driver pulley 1 to automatic back and forth movement in between "neutral" and the last forward speed selected. Such restrictive movement (on the driver pulley 1) could be generated also by other means like with an air or hydraulic cylinder, or by electrical means, instead of the selector arm 7, as shown.

The cable 10 is connected at one end pivoting mechanism a pivotingmechanism 11 which is meant for foot pedal operation (but could be of any other means) and which, through a pressure on the pedal generates a pulling force on cable 10 and also on the lower end of pivoting arm 12 (to which the cable 10 is connected), resulting in the top end pushing inwards (through two rubber fingers) on to washer plate 21 and outer thrust bearing, being part of the assembly with cupped hat 9 and clutch driver pulley 1 and, by the same token, promoting the closing of clutch driver pulley 1 on to position equivalent to first speed, such pivoting of arm 12 being limited by a stop 13 located crosswise through the bracket 14, and this would permit the calling, on demand, of compression from the motor which, normally would have the driver pulley 1 in position neutral when the motor is in its low R.P.M. regime.

FIG. 2 shows the cable assembly 6 comming from the forward end of the vehicle, and on to its direct connection with the thrust bearings assembly 2. This view shows the cupped hat 9 sandwiched in between sleeve 23, oil-impregnated bearing 15 and retaining nut 16 (all rotating with and being part of clutch driver pulley 1). The oil-impregnated bronze bearing 15 rotates on the shaft 17, which squeezes in compression (when under pull from the cable 6) the inner thrust bearing 18; thus preventing the clutch driver pulley 1 (through cupped hat 9) from closing any further, restricting any further automatic movement towards higher speed ratios, while still permitting unrestricted automatic movement towards lower ratios, down to neutral, or automatically upwards again, in relation to the torque loads and/or R.P.M. Of course, the selection on the sport console can restrict the clutch to any forward speed selected (as a maximum) or directly to neutral, if so selected (as shown in FIG. 1). A finger 24, hanging from and locked on to shaft 17, prevents the cable 6 from twisting. A spherical washer 28 could advantageously be used.

FIG. 3 shows a side view of the complete bracket 14 and pivoting arm assembly 12, as well as the thrust bearings assembly 2, and washer plate 21. The pivoting arm 12 (with its rubber fingers 20) is held in the retracted position by the pulling action of the spring 25 against the stop 26. If the motor is in low regime, clutch driver pulley 1 (FIG. 1) would be automatically on to neutral position, irrelevant of the positioning of the selector arm 7 (FIG. 1). A pull on the cable 10 pivots arm 12 and generates pressure against outer bearing assembly through pressure contact on washer plate 21, the outer thrust bearing 19, and the cupped hat 9 (all moving along from position A to position C), forcing the closing (controled from a stop 13) of the clutch driver pulley 1 (FIG. 1) creating a state of compression from the motor. We now have the equivalence of the motor working in compression, on the first speed (through the foot pedal control); a condition considered usefull, like when going downhill.

The mode of operation of this "Speed Selector Control for Torque-Convertor Systems" will now be explained with reference to FIG. 1.

In the straight forward movement of the vehicle, the power generated by the motor 27 is transmitted to the clutch driver pulley 1, through the belt 3 and variable driven pulley 4 on to the shaft 5, connecting possibly to a forward/reverse mechanism (not shown), and then on to the driving wheels (not shown); the clutch driver pulley 1 will pass (in relation to the motor R.P.M. and/or torque required), from neutral to full forward speed (if selector arm 7 is positioned on 4.th., from position A to position B, FIG. 3), unless higher torque demand brings temporarily the ratio to lower value and then automatically back again to 4.th. whenever the higher torque demand releases. This is for full speed ahead.

If encountering bad road conditions, or dirt roads, and consideration is given to slower speeds (either for higher torque, or for better control), a lower speed selection can be made (while moving ahead) to any of the desired other speed ratios whether 3.rd., 2.nd. or 1.st., by pulling backward on the selector arm 7 and locking on with the ratchet to the newly selected speed ratio. Now the torque converter will still work automatically (back and forth) anywhere in between neutral and the last speed ratio selected.

If back on good roads, or higher speeds are desired, the selector arm 7 can be moved again to 4.th. (while under way), and automatic features are now restored for anywhere in between neutral and 4.th. speed (position B, FIG. 3).

If now moving in 4.th. (or any of the forward speeds) and going downhill, the right foot is removed from the gas pedal (bringing the motor R.P.M. to idle, and the clutch to neutral) and the foot pedal 29 (part of pivoting assembly 11) is pressed on, than the clutch driver pulley 1 is forced in low (or 1.st.) and forces now the motor to work in compression. If the steepness of the hill is such that the motor has a tendency to race at higher speeds (while still in compression), the clutch driver pulley 1 will have a tendency to move automatically to higher ratios, preventing the motor from overrunning and by the same token, protecting the motor by forcing the use of the brakes, now used in conjunction with the compression feature, which is still on.

Of course, for small or recreational types of vehicles, simplification or lower cost considerations might allow for the removal of the compression features (relying more on the brakes) and/or of the removal of the cable pulleys (by rotating the position of the motor of 90°) and connecting direct and straightforwardly from the clutch driver pulley 1 to the selector arm 7. This would remove also the whole bracket assembly 14 (including pivoting arm 12), as well as the following assemblies of cable 10 and foot pedal 11 and 29.

In such a case, all that would be left (for full "SPEED SELECTOR CONTROL FOR TORQUE-CONVERTER SYSTEMS")would be:
1. an adaptor 9
2. a bearing assembly 2 (as per FIG. 2)
3. one cable assembly 6
4. and the selector shifting arrangement 7, 8 & 30.

I claim:

1. Speed selector control for V belt type of automatic torque-converters, for selective control of any one of the forward speed ratios, including neutral, in a practical and similar way to a sport car selective type of shifting on a sport console and yet, without interfering in any way, except if so selected, with the usual automatic features of the V belt type of automatic torque-converter systems, and especially for the types used on self-propelled vehicles, and comprising:
   - a thrust bearing assembly sandwiching an adaptor, with a first thrust bearing of said thrust bearing assembly on the inside of said adaptor, and moving longitudinally with it;
   - said adaptor solidly secured to the outboard sliding assembly of a clutch driver pulley and rotating with it;
   - a cable assembly secured at one end to said thrust bearing assembly, and at the other end to a selector shifting arm;
   - said selector shifting arm bearing a ratchet type of stop arrangement, and secured in a pivoting fashion within said sport type console, while extending above said console for visual selection of either neutral or of any one of the forward speed ratios.

2. - Speed selector control for V belt type of automatic torque-converters, for selective control of any one of the forward speed ratios, including neutral, in a practical and similar way to a sport car selective type of shifting on a sport console and yet, without interfering in any way, except if so selected, with the usual automatic features of the V belt type of automatic torque-converter systems, and especially for the types used on self-propelled vehicles, and comprising:
   - a thrust bearing assembly sandwiching an adaptor, with a first thrust bearing of said thrust bearing assembly on the inside of said adaptor, and moving longitudinally with it;
   - said adaptor solidly secured to the outboard sliding assembly of a clutch driver pulley and rotating with it;
   - a first cable assembly secured at one end to said thrust bearing assembly, and at the other end to a selector shifting arm;
   - said selector shifting arm bearing a ratchet type of stop arrangement, and secured in a pivoting fashion within said sport type console, while extending above said console for visual selection of either neutral or of any one of the forward speed ratios; and wherein the said speed selector control for torque-converter systems, for selective control of from anywhere from neutral to any one of the forward speeds selected, would also include additional features permitting to bring on motor compression, on demand, and which comprises:
   - a second thrust bearing of said thrust bearing assembly, on the outside of the cupped adaptor, and moving longitudinally with it;
   - a bracket for holding a pivoting arm, two stops and a tension spring;
   - said pivoting arm, pivoting within said bracket and pressing from the top, on demand, on the said second thrust bearing;
   - a second cable assembly secured at one end to the lower end of the said pivoting arm and at the other end to a foot pedal assembly;
   - said foot pedal pivoting assembly rotatably secured to and conveniently located in the driver's compartment.

3. - A system according to claim 2, having a bracket arrangement connecting the said first and second cable assemblies in such a way so as to permit different angles of approach, and which comprises:
   - a set of pulleys, for a change in direction of said cable assemblies, and which said pulleys are rotatably secured to a holding bracket;
   - said bracket for holding the cable pulleys, pivoting arm, stops and tension spring.

4. - A system according to claim 3, wherein said first and second cable assemblies are actuated by hydraulic means.

5. - A system according to claim 3, wherein said first and second cable assemblies are actuated by pneumatic means.

6. - A system according to claim 3, wherein said first and second cable assemblies are actuated by electrical means.

* * * * *